United States Patent [19]

Wang

[11] Patent Number: 5,535,386
[45] Date of Patent: Jul. 9, 1996

[54] TRANSACTION AND VERSION MANAGEMENT SYSTEM

[75] Inventor: Chung C. Wang, Dallas, Tex.

[73] Assignee: Texas Instruments Incorporated, Dallas, Tex.

[21] Appl. No.: 484,619

[22] Filed: Jun. 7, 1995

Related U.S. Application Data

[63] Continuation of Ser. No. 81,483, Jun. 22, 1993, which is a continuation of Ser. No. 569,360, Aug. 17, 1990, abandoned.

[51] Int. Cl.$^6$ .................................................. G06F 17/30
[52] U.S. Cl. .................... 395/600; 395/700; 395/500; 364/974.7; 364/282.4; 364/DIG. 1; 364/DIG. 2
[58] Field of Search .................................. 395/600, 700, 395/500

[56] References Cited

PUBLICATIONS

Beech et al., "Generalized Version Control In an Object–Oriented Database", *Proceedings of the Fourth International Conference on Data Engineering*, 1–5 Feb. 1988, Los Angeles, Ca., pp. 14–22.

Narayanaswamy et al., "An Incremental Mechanism For Schema Evolution in Engineering Domains", *Proceedings Fourth International Conference on Data Engineering*, 1–5 Feb. 1988, Los Angeles, Ca., pp. 294–301.

Chou et al., "Versions and Change Notification in an Object–Oriented Database System", *25th ACM/IEEE Design Automation Conference*, 12–15 Jun., Anaheim, California, pp. 275–281.

Hardwick et al., "The ROSE Data Manager: Using Object Technology to Support Interactive Engineering Applications", *IEEE Transactions On Knowledge and Data Engineering*, vol. 1, No. 2, Jun., 1989, pp. 285–289.

Kitagawa et al., "Design Data Modeling With Versioned Conceptual Configuration", *Proceedings of the 13th Annual International Computer Software and Applications Conference*, 20–22 Sep. 1989, Orlando, Fla, pp. 225–233.

Hardwick et al., "Using a Relational Database as an Index to a Distributed Object Database in Engineering Design Systems", *Second International Conference on Data and Knowledge for Manufacturing and Engineering*, 16–18 Oct. 1989, pp. 4–11.

Rao et al., "*Dynamo: A Time–Based Object–Oriented Model to Support Distributed Collaborative Development*", 8–10 May 1990, Tel–Aviv, Israel, pp. 61–69.

Spooner et al., "The Evolution of ROSE: An Engineering Object–Oriented Database System", *Proceedings of Rensselaer's Second International Conference on Computer Integrated Manufacturing*, 21–23 May 1990, Troy, New York, pp. 16–23.

Joseph et al., "Object–Oriented Databases: Design and Implementation", *Proceedings of the IEEE*, vol. 79, No. 1, Jan., 1991, pp. 42–64.

Agrawal et al., "Object Versioning in Ode", *Proceedings. Seventh International Conference on Data Engineering*, 8–12 Apr., Kobe, Japan, pp. 446–455.

Kafer et al., "Mapping a Version Model to a Complex–Object Data Model", *Eighth International Conference on Data Engineering*, 2–3 Feb., 1992, Tempe Arizona, pp. 348–357.

*Primary Examiner*—Thomas G. Black
*Assistant Examiner*—Paul R. Lintz
*Attorney, Agent, or Firm*—Tammy L. Williams; Leo N. Heiting; Richard L. Donaldson

[57] ABSTRACT

Each element of a database may have multiple versions; the versions are partitioned into branches, and versions of a branch are ordered linearly according to their timestamps. Branches are timestamped and related to one another by a version graph. Each version of an element of a database is represented by a unique identifier, a timestamp, a branch name and a value. A new version of an element associated with a branch is created in response to an operation associated with the branch which would modify the element. An object graph in the database is represented independent of the branches and version; an application coded for elements in one version (and branch) can be reused for the same elements in a different version and (different branch) without any re-coding effort. Methods for long duration transactions, cooperative transactions and schema evolutions are provided.

3 Claims, 1 Drawing Sheet

TRANSACTION AND VERSION MANAGEMENT SYSTEM

This is a continuation of application Ser. No. 08/081,483, filed Jun. 22, 1993 which is a continuation of Ser. No. 07/569,360, filed Aug. 17, 1990, abandoned.

RELATED APPLICATIONS

This application is related to U.S. patent application Ser. No. 07/531,493, filed May 30, 1990, entitled "A System and Method For Database Management Supporting Object-Oriented Programming" and now abandoned, by Bannon et al. (Attorney Docket No. TI-15150), which is incorporated by reference herein.

TECHNICAL FIELD OF THE INVENTION

This invention relates generally to the field of computer databases, and more particularly to a transaction and version management system.

BACKGROUND OF THE INVENTION

Computer databases are widely used by businesses to access data for performing business transactions, such as making a savings account deposit or a withdrawal, reserve or purchase an airline ticket, buy or sell a security, etc. Each of these business transactions rely on the integrity of the data in the databases; i.e., the balance in the savings account must reflect the correct amount after the deposit or withdrawal. While conventional database applications generally comprise "short transactions" running for a few milliseconds, new applications, such as computer-aided design may include "long" transactions, which have the possibility of running for days, or even for weeks.

The databases described in the business transactions above are generally accessed and modified by multiple concurrently-run computer programs. Each of these concurrently-run programs (hereinafter, referred to as "transactions") comprise a plurality of operations on the database elements. In order to increase efficiency, the operations of the concurrently-run transactions are interleaved. The outcome of interleaved transactions, of course, should be the same as the outcome of running the transactions serially. A system which promotes this property is referred to as "serializable."

Without some control mechanism, concurrent transactions may result in one transaction's operations affecting another transaction's operations by accessing (reading and/or writing) the same element of the database. Such interferences may result in erroneous data in the databases; i.e., they may affect the "consistency" of the database. Protocols presently exist to protect the consistency of the database while it is accessed by concurrently running transactions. One such protocol is a static two-phase locking scheme. The static two-phase locking scheme provides "locking" all the database elements to be accessed by a transaction, before any operation of the transaction is performed, thus preventing any other transactions from accessing and altering the database elements. The database elements are "unlocked" immediately following the end of the transaction. If a transaction "commits" after its last operation, all database elements retain their values as updated by the transaction. If a transaction is "aborted", all database elements return to their values before as they were before the transaction.

A similar protocol, a dynamic two-phase locking scheme, locks each data item to be accessed by the transaction immediately prior to each accessing operation, and then releases the locks on all the data items immediately following the last operation of the transaction.

Both the static and dynamic two-phase locking scheme exhibit a first phase, during which locks are acquired on required data items, and a second phase, during which all the locks are released. By locking the database elements, a form of scheduling is achieved, since only the transactions that have locked all of their required data items are executed to completion. Other transactions which require access to database elements locked by another program, must wait until the lock is released. In other words, the locking scheme in effect puts concurrently-run programs in serial execution form at the cost of reducing throughput. Thus, if a long transaction locks an element needed by one or more short transactions, the short transactions may wait days or weeks before executing.

The two-phase locking schemes are referred to as "pessimistic," since they assume that an inconsistency will result between two or more concurrent transactions. "Optimistic" concurrency control allows a transaction to proceed as if there were no conflict, and performs a validation check at the time of commit of the transaction. The system assigns a unique timestamp to a transaction when it first begins to run. The transaction has a consistent view of the database during its execution; at commit time, the database systems checks, based on the timestamp, whether this consistent view of the database has changed between the start and finish of the transaction. If the consistent view still holds, the transaction is committed; if not, the transaction is aborted.

This protocol also has disadvantages, particularly with long transactions, since a transaction will run to its end before the determination is made whether it will be aborted or committed. If aborted, the entire transaction will need to be re-executed, which is an inefficient use of processing time, especially when a long transaction must be re-executed.

Further, present day databases do not adequately provide for cooperative efforts between multiple users. In a cooperative transaction, the work done by the team should be an atomic (indivisible) transaction. Also, members of the team should be able to view and modify the other team member's intermediate results. Accordingly, a need has arisen for a consistency control scheme that increases throughput of both long and short transactions and supports cooperative efforts between multiple users.

SUMMARY OF THE INVENTION

In accordance with the present invention, a database is provided which substantially eliminates or prevents the problems associated with prior databases.

In the database of the present invention, each version of an element of the database is represented by a unique identifier, a timestamp, a branch name and a value. A new version of an element is created in response to an operation which would modify the element. Thereafter, the value of the new version of the element is modified responsive to said operation.

Each element of the database may have multiple versions; the versions are partitioned into branches and versions of a branch are ordered linearly according to their timestamps. Branches are themselves timestamped and related to each other by a version graph. An object graph in the database may be represented independent of branches and versions.

The database of the present invention provides significant advantages over the prior art. A database may be organized in multi-linear versions and a version graph, allowing an application to access implicitly an object graph of a given version in a given branch through object fault. Further, a long transaction may be modeled using a sequence of "regular" transactions accessing a common branch of versions. Cooperative transactions may be accommodated, allowing team member to access the data from other team members while providing locks specific to a cooperative transaction which preserve the consistency of the database.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention is best understood by referring to FIGURES of the drawings, like numerals being used for like and corresponding parts of the various drawings.

Linear versions are provided for in Zeitgeist, described in U.S. patent application Ser. No. 07/531,493, filed May 30, 1990, entitled "A System and Method For Database Management Supporting Object-Oriented Programming", by Bannon et al. (Attorney Docket No. TI-15150), which is incorporated by reference herein. The linear versions present a unique way for organizing objects in a database. Briefly, a Zeitgeist user can view his database as a set of triplets <oid, t, value> where oid is an object identifier, t is a timestamp, and value is the associated value of the object at the given timestamp. An update on an object always appends a new value with a more recent timestamp to the object. An application program retrieves an object either explicitly by specifying an oid and a t or implicitly through object fault when dereferencing a pointer.

In a linear version system, a pointer referencing another object contains only oid so that an object graph can be specified independent of versions. An exemplary object graph is shown schematically in FIG. 1. In this object graph 10, the object "car" 12 points to related objects "door" 14, "hood" 16, "trunk" 18 and "bumper" 20. Further relations are shown as the object "door" points to objects "handle" 22 and "lock" 24. A particular version of an object graph is uniquely identified by a timestamp, referred to as a "time context" in Zeitgeist. Given timestamp t, the version of an object graph consists of one version from each object that has the most recent timestamp with respect to t.

Figure 1:
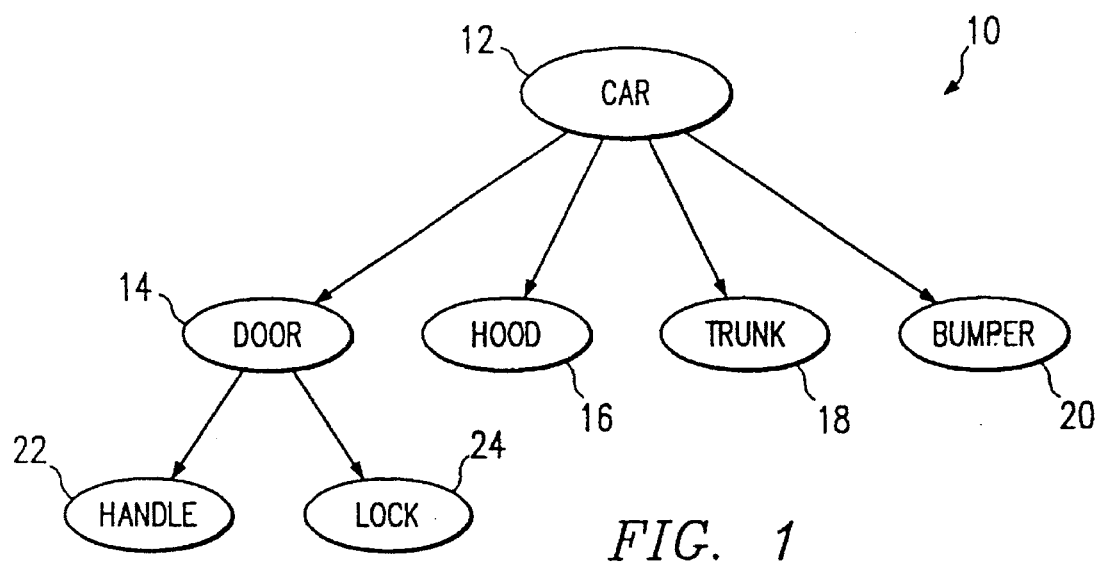
FIG. 1 illustrates a block diagram of an exemplary object graph.

Being an integral part of this object graph concept, the object faulting mechanism is designed to fetch a version of an object graph into the main memory without any apparent action on the part of a user. In the example of FIG. 1, the user would not need to explicitly fetch the object "door" 14 once the object "car" 12 had been brought into memory; instead, the object "door" 14 could be brought into memory by merely referencing "door" 14. The object faulting mechanism, however, breaks down when branching versions are stored as linear versions in a database.

There are two ways to map branching versions into linear versions. One way is to use a new oid for each object in a new branch of versions. In this approach, the representation of an object graph depends on the branch of versions the object graph is in. Code developed for one branch of versions cannot be reused directly in another branch of versions. This approach is the only method which can be used in non-linear versions. The other approach is to map versions of different branches of an object into different linear versions of the same object. The following example illustrates this approach.

As an example, assume that a database of linear versions consists of two objects, x and y. Let $x(t_1)$ denote the version of object x with timestamp $t_1$. Let A and B be the names of two branches of versions. The following mapping of objects from versions in A and B to linear versions is based on the time that the objects are updated within each branch of versions. Let the versions of x and y at t=0 be x(0) and y(0). Table 1 illustrates the changing of the objects by the two branches from t=1 to t=4.

TABLE 1

|   | $t = 1$ | $t = 2$ | $t = 3$ | $t = 4$ |
|---|---------|---------|---------|---------|
| A | x(0) -> x(1) |  | y(0) -> y(3) |  |
| B |  | x(0) -> x(2) |  | y(0) -> y(4) |

The most recent versions in branch A and branch B are, respectively, {x(1), y(3)} and {x(2), y(4)}. The versions that correspond to different time contexts are shown in Table 2.

TABLE 2

| TIME CONTEXT | VERSIONS |
|--------------|----------|
| $t = 0$ | {x(0),y(0)} |
| $t = 1$ | {x(1),y(0)} |
| $t = 2$ | {x(2),y(0)} |
| $t = 3$ | {x(2),y(3)} |
| $t \geq 4$ | {x(2),y(4)} |

The above example is typical for mapping different branch versions of an object into different timestamps of the same object. This kind of mapping also precludes versions of two branches of an object having the same timestamps being created. The object graph is again no longer version independent. It is only by coincidence that branch B's most recent version is the same as those of time context $t \geq 4$. In general, a version of an object graph in a given branch cannot be identified with a time context. The current object faulting algorithm cannot, therefore, be used to fault in a version of an object graph in a given branch. An application program must rely on the explicit fetch command to fetch one object at a time in referencing an object graph—a tedious operation for a user to do.

The present invention may be implemented using a general purpose computer. In the present invention, a multi-linear approach is utilized. In a multi-linear version scheme, the database can be viewed as a set of 4-tuples, <oid, b, t, value> and a version graph. The new quantity b represents the name of a branch of versions. The version graph represents the relationship among the branches of versions. The other three quantities, oid, t, and value, represent the same factors as in linear versions. An object graph in this model is represented in a version independent way—a pointer to an object in the database contains only oid.

Figure 2:
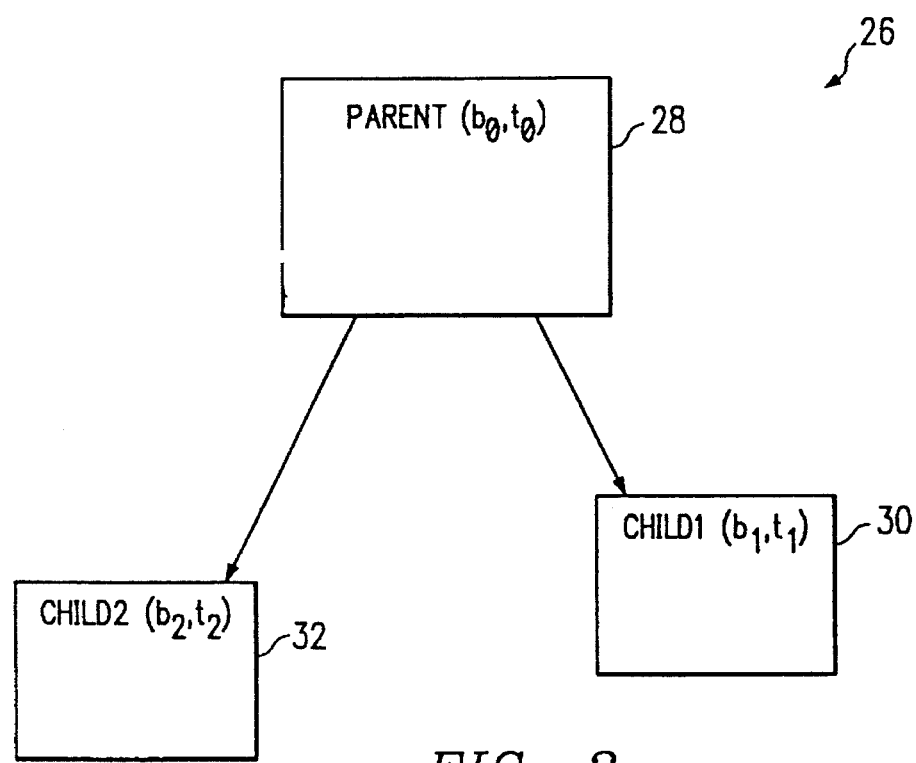
FIG. 2 illustrates a block diagram of an exemplary version graph.

Whenever an application changes an object in a multi-linear version database, the object is never modified in place; a new version of the object is stamped $(b_m,t_n)$, where $b_m$ is the name of a branch of versions (i.e., a branch name) and $t_n$ a unique timestamp, and appended to the branch $b_m$ in the database. When a new branch $b_{m+1}$ is created from branch $b_m$, the new branch is timestamped $T(b_{m+1})$; the parent and child relationship between branch $b_m$ and $b_{m+1}$ together with their timestamps are kept in a version graph shown schematically in FIG. 2. The version graph shows a parent branch 28 (with branch name "$b_0$" and timestamp "$t_0$") with two child branches 30 and 32. The child branches have each created new versions of the "car" object from the parent branch. An object in the parent branch $b_m$ is accessible in the child branch $b_{m+1}$ using the concept of "copy-on-write" wherein the objects from the parent are copied only at the time when they can no loner be shared between parent and child branches Also, a "context", c, is defined to be (B(c), S(c)) where B(c) is the branch name of c and S(c) the timestamp of c. Context is a generalization of the time context of linear versions.

The previous example is presented again using the multi-linear approach described above. Assume that a database of multi-linear versions contains two objects x and y. Let $x(b,t_1)$ denote the version of object x with branch name b and timestamp $t_1$. Let A and B denote the names of two branches of versions. The following represents one scenario that two applications, one using the branch of versions A and the other B, may have updated the database at time t=1,2,3, and 4. Let A and B have a common parent branch 0 at time t=0 and the versions of x and y at time t=0 be x(0,0) and y(0,0).

TABLE 3

|   | t = 1 | t = 2 | t = 3 | t = 4 |
|---|---|---|---|---|
| A | x(0,0)->x(A,1) |  | y(0,0)->y(A,3) |  |
| B |  | x(0,0)->x(B,2) |  | y(0,0)->y(B,4) |

The most recent versions in branches A, B and 0 at t>4 are, respectively, {x(A,1),y(A,3)}, {x(B,2),y(B,4)} and {x(0,0), y(0,0)}. The versions that correspond to different contexts are shown in Table 4.

TABLE 4

|   | c(A,t) | c(B,t)+ee |
|---|---|---|
| +e,uns t = 0 | {x(0,0),y(0,0)} | {x(0,0),y(0,0)} |
| t = 1 | {x(A,1),y(0,0)} | {x(0,0),y(0,0)} |
| t = 2 | {x(A,1),y(0,0)} | {x(B,2),y(0,0)} |
| t = 3 | {x(A,1),y(A,3)} | {x(B,2),y(0,0)} |
| t > = 4 | {x(A,1),y(A,3)} | {x(B,2),y(B,4)} |

The example illustrates that the set of instances for each context is clearly identifiable; the object faulting algorithm can thus be used to fetch implicitly an object graph from database into main memory for each given context.

A storage manager supporting multi-linear versions has the following interface functions:

Fetch($c_1,c_2$,oid) function fetches an object from the database. The arguments $c_1$ and $c_2$ are contexts an oid is the identifier of the fetched object; the branch B($c_1$) is an ancestor branch of B($c_2$) in the version graph; and the timestamp S($c_1$)≦the timestamp S($c_2$). The following steps implement the idea of copy-on-write in fetching an object:

1. Let b=B($c_2$) and t=S($c_2$). Execute Step 2.

2. Search for an object with the given oid in branch b and which has a timestamp that is most recent with respect to t; if an object is found, return it. Otherwise execute step 3.

3. Let t=T(b) and b be the parent branch of b. If either t≦S($c_1$) or b is a parent branch of B($c_1$), then return "not found". Otherwise go to execute step 2 again.

Step 3 is executed when the object that has an earlier timestamp than t cannot be found in branch b; the search of the same object then begin at the parent branch of b with a timestamp earlier than the timestamp of b—the creation time of b. The adjustment of the timestamp of t is required because the object may have a version created in the parent branch of b after b has been created.

CreateObject(c) function creates a new object in the current context. A unique oid is returned.

CreateBranch(from) function creates a new branch from a given existing branch, from. A timestamped unique branch name is entered in the version graph and returned to the caller.

An application can fetch an object either using explicitly the fetch function or implicitly the object faulting mechanism. Object fault occurs when an application dereferences a pointer. Object faulting also invokes the fetch function; the arguments of fetch are a default context and the oid in the pointer being dereferenced. The invocation of the fetch function by the computer during object faulting is transparent to the user.

A version graph comprises branches as nodes and parent-child relationships as edges. Each branch is created with a unique timestamp. A node in a version graph contains a branch name and its timestamp. A direct edge from node ($b_1,t_1$) of branch $b_1$ and timestamp $t_1$ to node ($b_2,t_2$) of branch $b_2$ and timestamp $t_2$ means that branch $b_2$ is a child branch of $b_1$. The fetch function uses the version graph to implement copy-on-write in fetching an object.

Given an oid, the same objects in different branches are locked separately; locking an object of one branch does not preclude the same object (i.e., with the same oid) in other branches from being accessed. A long transaction and a short transaction accessing the same object of different branches do not, therefore, block each other.

A long transaction in a multi-linear version model can be thought as a sequence of "regular" transactions operating on a private branch of a database. The intermediate results are saved in the database when a member transaction of the sequence commits. To abort a long transaction in this model simply discards the associated branch of objects. To commit a long transaction is equivalent to merging the branch with its parent branch; minor inconsistencies between versions encountered during merging can be adjusted manually.

A branch and its parent branch in a version graph can be associated with different data definitions of an object as found in schema evolution. When an object that exists in the parent branch is referenced for the first time in the child branch, a conversion from the old to the new data definition can then be triggered to take place. In other words, the proposed scheme can support directly a lazy evaluation style of schema evolution.

In a cooperative design team, members can view each other's intermediate results. The work done by an individual member cannot be atomic with respect to other members'. But the collection of work done by all members should preserve database consistency. That is, a cooperating team's work should be serializable with the work done outside the team. In short, a cooperative transaction model should satisfy:

* The work done by the entire team is an atomic transaction.

* Members of a cooperative design team can view and modify each other's intermediate results.

The multi-threaded transaction model disclosed herein solves the cooperative transaction problem. A thread models the work of a member of a cooperating team. Objects locked by a transaction are accessible to all the threads of the transaction; members of a team could access each other's intermediate results. A team's work that is modeled by a multi-threaded transaction preserves database consistency as a "regular" transaction does.

In a multi-threaded transaction that models the cooperative design work a thread models the work of a member of a cooperating team. The following schemes solves the concurrency control problems associated in a multi-threaded transaction.

1. Shared access among threads—

Objects locked by a transaction are accessible to all the threads of a transaction. Concurrency control among threads again can be resolved through locking. The execution of the threads of a transaction clearly are not serializable. Locking at thread level does not need to follow the two-phase locking protocol. As soon as the access of an object is over, a thread should release the lock. A lock released by a thread should be retained by the transaction until the transaction commits so that a strict two-phase locking protocol is observed at the transaction level.

"ThreadRead" is a shared lock and guarantees that no other threads can append a new version to the object. This command may be used by a team member who must have the latest version of an object. "ThreadWrite" is an exclusive lock that allows the owner of the lock to append a new version to the object. A "ThreadNotification" lock is used when a thread wishes to be notified whenever there is a newer version appended to the object by other threads or transactions.

2. Transparency of thread level locks—

An application writer should see no difference between thread level and transaction level locks. A thread should release a lock as soon as its use is over. The system manages the mapping between the thread level locks and the transaction levels. The system also retains the transaction level locks for a transaction until it commits (or aborts) to enforce the two-phase locking protocol at the transaction level.

3. Two-phase commit—

The commit action must be synchronized among the threads using two-phase commit protocol.

4. Deadlock—

A thread waiting for a lock to be released by a different thread or transaction may deadlock with the other threads or transactions. Since a thread cannot be restarted the same way as a transaction, the resolution of deadlock involving a thread should be left as a user's or a cooperating team's responsibility. Deadlock among threads of a transaction distinguishes multi-thread transaction from a distributed transaction because there is generally no deadlock among the threads at different sites of a distributed transaction if the objects at different sites are disjoint and each thread access the data local to its thread. If deadlock is unwanted among threads of a transaction, an application may use any scheme itself to prevent deadlock from occurring.

5. User Interface—

A Begin_Thread function with a transaction id as input argument returns a unique thread id if it is successfully registered with the transaction. Otherwise Begin_Thread returns a Null value. Most interface functions that are available in a transaction are also applicable in a thread of a transaction.

Representing an object graph independent of its versions is an important design feature that enables code reuse when an application needs to work with different versions. The current implementation in Zeitgeist is adequate for linear versions, but not for branching versions. Both long duration transactions and fine grain version management need to deal with branching versions at storage level. Multi-linear versions, a model for supporting branching versions, preserve the representation independence of an object graph and are a natural extension of the current implementation of linear versions in Zeitgeist.

The present invention provides several technical advantages over the prior art. A database may be organized in multi-linear versions and a version graph so that an application can access implicitly an object graph of a given version in a given branch through object fault.

Further, a long transaction may be modeled using a sequence of "regular" transactions accessing a common branch of versions.

The present invention supports fine grain version management at the storage management level. The version graph is for the entire database-not one version graph per object. Also, the present invention supports lazy evaluation style schema evolution directly.

While the present invention has been described in connection with an object oriented database, it may be used in connection with other databases as well.

Although the present invention has been described in detail, it should be understood that various changes, substitutions and alterations can be made herein without departing from the spirit and scope of the invention as defined by the appended claims.

What is claimed is:

1. A method of managing versions and configurations of a plurality of objects comprising the steps of:

providing a database which includes a plurality of data elements represented by four-tuples, said four-tuples comprising a unique identifier, a timestamp, a branch name, and a data value;

generating a version graph which represents relationships among said elements;

generating an object graph which represents a particular configuration of a portion of said elements;

accessing said portion of said elements in said database in accordance with a first context, a second context, and said unique identifier in response to operations requested by an application program on said object graph using a storage manager.

2. The method of claim 1 wherein said accessing step includes the step of accessing said portion of said elements in said database where said unique identifier identifies an element on a particular branch of said version graph between a first branch identified by said first context and a second branch identified by said second context.

3. The method of claim 1 wherein said accessing step includes the step of accessing said portion of said elements in said database where said unique identifier identifies an element generated at a particular time which is between a first time associated with said first context and a second time associated with said second context.

* * * * *